United States Patent
Lee et al.

(10) Patent No.: US 12,304,982 B2
(45) Date of Patent: May 20, 2025

(54) POLYOLEFIN POLYMER AND POLYOLEFIN POLYMERIZATION SYSTEM AND METHOD

(71) Applicant: DL Chemical CO., LTD., Seoul (KR)

(72) Inventors: Hee Jun Lee, Sejong-si (KR); Byung Keel Sohn, Daejeon (KR); Seung Tack Yu, Gyeonggi-do (KR); Young Shin Jo, Daejeon (KR); Sung Ho Choi, Sejong-si (KR); Sung Woo Kang, Daejeon (KR); Byung Soon Chun, Daejeon (KR)

(73) Assignee: DL CHEMICAL CO., LTD., Seoul (KR)

( * ) Notice: Subject to any disclaimer, the term of this patent is extended or adjusted under 35 U.S.C. 154(b) by 0 days.

(21) Appl. No.: 18/780,799

(22) Filed: Jul. 23, 2024

(65) Prior Publication Data

US 2025/0092173 A1 Mar. 20, 2025

(30) Foreign Application Priority Data

Sep. 14, 2023 (KR) .......................... 10-2023-0122347
Jan. 9, 2024 (KR) .......................... 10-2024-0003448

(51) Int. Cl.
| | | |
|---|---|---|
| C08F 210/16 | (2006.01) | |
| C08F 2/01 | (2006.01) | |
| C08F 2/14 | (2006.01) | |
| C08F 2/34 | (2006.01) | |

(52) U.S. Cl.
CPC ............ *C08F 210/16* (2013.01); *C08F 2/01* (2013.01); *C08F 2/14* (2013.01); *C08F 2/34* (2013.01); *C08F 2400/02* (2013.01)

(58) Field of Classification Search
USPC .................................. 526/65, 904; 428/407
See application file for complete search history.

(56) References Cited

U.S. PATENT DOCUMENTS

| | | | |
|---|---|---|---|
| 4,970,279 | A | 11/1990 | Bailly et al. |
| 4,994,534 | A | 2/1991 | Rhee et al. |
| 5,017,665 | A | 5/1991 | Chang |
| 5,100,979 | A | 3/1992 | Eisinger et al. |

(Continued)

FOREIGN PATENT DOCUMENTS

| | | |
|---|---|---|
| CN | 104072654 A | 10/2014 |
| JP | H07188323 A | 7/1995 |

(Continued)

OTHER PUBLICATIONS

Machine-generated English language translation of Description of CN10407265A, 17 pages, retrieved from ESPACENET on Oct. 3, 2024. (Year: 2014).*

*Primary Examiner* — Fred M Teskin
(74) *Attorney, Agent, or Firm* — SALIWANCHIK, LLOYD & EISENSCHENK

(57) ABSTRACT

An embodiment of the present disclosure relates to a polyolefin polymer including a core portion and a shell portion, wherein the core portion has a density of 0.857 g/cm³ to 0.910 g/cm³, the shell portion has a density of 0.890 g/cm³ to 0.940 g/cm³, and the density of the shell portion is higher than that of the core portion, and a polymerization system and polymerization method of producing the same.

18 Claims, 4 Drawing Sheets

(56) References Cited

U.S. PATENT DOCUMENTS

| | | | |
|---|---|---|---|
| 5,106,926 A | 4/1992 | Eisinger et al. | |
| 5,712,353 A | 1/1998 | Poirot et al. | |
| 7,122,606 B2 * | 10/2006 | Tonti | C08F 110/06 526/904 |
| 2009/0169895 A1 * | 7/2009 | Nohara | C08J 9/0061 428/407 |
| 2019/0119419 A1 * | 4/2019 | Albunia | C08F 210/16 |
| 2019/0389988 A1 * | 12/2019 | Ye | C08F 4/6228 |

FOREIGN PATENT DOCUMENTS

| | | |
|---|---|---|
| JP | 2000017124 A | 1/2000 |
| WO | 8802379 | 4/1988 |
| WO | 0202323 A1 | 1/2002 |
| WO | 2023012256 A1 | 2/2023 |

* cited by examiner

POLYOLEFIN POLYMER AND POLYOLEFIN POLYMERIZATION SYSTEM AND METHOD

CROSS-REFERENCE TO RELATED APPLICATION

This application claims priority to and the benefit of Korean Patent Application No. 10-2023-0122347, filed on Sep. 14, 2023; and Korean Patent Application No. 10-2024-0003448, filed on Jan. 9, 2024, in the Korean Intellectual Property Office, each of which are incorporated herein by reference in their entireties.

BACKGROUND

1. Field

An embodiment of the present disclosure relates to a polyolefin polymer and a polyolefin polymerization system and method.

2. Description of the Related Art

Linear low density polyethylene (LLDPE) is widely known to be produced through a gas phase process using a fluidized bed reactor, and is specifically produced through copolymerization of an ethylene monomer and a comonomer in the presence of a catalyst.

When a polymer such as LLDPE is produced, a large comonomer with 4 or more carbon atoms compared to an ethylene monomer is used. Due to its low vapor pressure, the comonomer is condensed in a polymerization reactor and absorbed into the polymer, causing the polymer to swell. Polymers containing a large amount of comonomers have low crystallinity and low melting points, resulting in sticky wet resins in the polymerization reactor. Due to their stickiness in the reactor, sticky polymers hinder fluidization and adversely affect the continuous operation of the gas phase polymerization reactor.

U.S. Pat. No. 4,994,534 describes a process for producing sticky polymers such as ethylene/propylene rubber by adding silica or clay during polymerization. When these materials are added to a reactor, not only a polymer that is unusable for many applications is produced, but also it can cause contamination in heat exchangers, compressors, and other reactor systems.

Similarly, U.S. Pat. No. 4,970,279 and International Patent Publication WO 88/02379 describe a method of adding pulverized minerals such as silica or alumina to a reactor. U.S. Pat. Nos. 5,100,979 and 5,106,926 describe processes for producing ethylene/1-octene copolymers using a specific titanium-based catalyst system or a specific vanadium-based catalyst system that is not commercially available. U.S. Pat. No. 5,017,665 describes a method of producing a polymer with very low molecular weight and low density by producing ethylene/1-butene/1-4-hexadiene under a metallocene/aluminoxane catalyst system. In addition, U.S. Pat. No. 5,712,353 describes a method of producing an elastomer with a relatively high molecular weight and low density using a metallocene catalyst. In this method, an elastomer with a high molecular weight and a low density was produced at a temperature of 50° C. or higher, but there was a problem in that when an elastomer is produced at high temperatures, it is difficult to operate continuously due to its low melting point and stickiness.

RELATED ART DOCUMENTS

Patent Documents (Patent Document 1) 1. U.S. Pat. No. 4,994,534
(Patent Document 2) 2. U.S. Pat. No. 4,970,279
(Patent Document 3) 3. International Patent Publication WO 88/02379
(Patent Document 4) 4. U.S. Pat. No. 5,100,979
(Patent Document 5) 5. U.S. Pat. No. 5,106,926
(Patent Document 6) 6. U.S. Pat. No. 5,017,665
(Patent Document 7) 7. U.S. Pat. No. 5,712,353

SUMMARY

The present disclosure provides a low density polyolefin polymer including a core portion and a shell portion and having a density distribution so that the density of the shell portion is higher than that of the core portion, and a polymerization system and a polymerization method thereof in order to prevent the problem of reduced process stability due to stickiness that makes continuous operation difficult when the surface of the polymer has a low density.

An embodiment of the present disclosure provides a polyolefin polymer including a core portion and a shell portion, wherein the core portion has a density of 0.857 g/cm$^3$ to 0.910 g/cm$^3$, the shell portion has a density of 0.890 g/cm$^3$ to 0.940 g/cm$^3$, and the density of the shell portion is higher than that of the core portion.

The polyolefin polymer may have any one or more of the following physical properties (a) to (h):

(a) a melt flow index (MIE) (2.16 kg load, 190° C.) of 0.1 g/10 min to 5.0 g/10 min;
(b) a density of 0.870 g/cm$^3$ to 0.900 g/cm$^3$;
(c) two or more melting temperatures ($T_m$);
(d) having a first melting temperature ($T_{m1}$) and a second melting temperature ($T_{m2}$), wherein the difference between the first melting temperature and the second melting temperature is 30° C. to 70° C.;
(e) having a first melting temperature ($T_{m1}$) and a second melting temperature ($T_{m2}$), wherein the first melting temperature is 45° C. to 85° C. and the second melting temperature is 80° C. to 125° C.;
(f) two or more crystallization temperatures ($T_c$);
(g) having a first crystallization temperature ($T_{c1}$) and a second crystallization temperature ($T_{c2}$), wherein the first crystallization temperature is 40° C. to 100° C. and the second crystallization temperature is 70° C. to 110° C.; and
(h) having two or more peaks at a temperature of 35° C. or higher in a temperature rising elution fractionation (TREF) chromatogram and a percentage value of 5% or more, which is obtained by dividing the area under the graph above 60° C. by the total area under the graph.

The core portion may have a density of 0.857 g/cm$^3$ to 0.910 g/cm$^3$ and a melting temperature of 45° C. to 85° C., the shell portion may have a melt flow index (MIE) (2.16 kg load, 190° C.) of 0.01 g/10 min to 5.0 g/10 min, a density of 0.890 g/cm$^3$ to 0.940 g/cm$^3$, a melting temperature of 80° C. to 125° C., and exhibit a peak at a temperature of 60° C. or higher in a temperature rising elution fractionation (TREF) chromatogram, and the weight ratio of the core portion and the shell portion may be 40:60 to 90:10.

Another embodiment of the present disclosure provides a polyolefin polymerization system including one or more slurry polymerization reactors that produce a slurry reaction product including a prepolymer through slurry polymerization of a feed stream supplied in the presence of a catalyst; and one or more gas phase polymerization reactors that produce a gas phase reaction product including a final polymer through gas phase polymerization of the slurry reaction product or the slurry reaction product and the feed stream, wherein the feed stream includes a monomer and a comonomer, the final polymer has a density distribution of two or more densities by including a core portion and a shell portion, which has a higher density than the core portion, and the operating temperature of the slurry polymerization reactor is 20° C. to 70° C., which is higher than the operating temperature of the gas phase polymerization reactor.

The polyolefin polymerization system may include a first slurry polymerization reactor that produces a slurry reaction product including a prepolymer through slurry polymerization of a feed stream supplied in the presence of a catalyst; and a first gas phase polymerization reactor that produces a gas phase reaction product including a final polymer through gas phase polymerization of the slurry reaction product or the slurry reaction product and the feed stream.

The polyolefin polymerization system may include a first slurry polymerization reactor that produces a first slurry reaction product including a prepolymer through slurry polymerization of a feed stream supplied in the presence of a catalyst; a second slurry polymerization reactor that produces a second slurry reaction product including a prepolymer through slurry polymerization of the first slurry reaction product, or the first slurry reaction product and the feed stream, supplied from the first slurry polymerization reactor; a first gas phase polymerization reactor that produces a first gas phase reaction product including a final polymer through gas phase polymerization of the second slurry reaction product, or the second slurry reaction product and the feed stream, supplied from the second slurry polymerization reactor; and a second gas phase polymerization reactor that produces a second gas phase reaction product including a final polymer through gas phase polymerization of the first gas phase reaction product, or the first gas phase reaction product and the feed stream supplied from the first gas phase polymerization reactor.

The catalyst may be a metallocene single catalyst.

The monomer may be ethylene.

The comonomer may be any one or more selected from the group consisting of 1-butene, 1-hexene, 1-pentene, 4-methyl-1-pentene, and 1-octene.

The operating temperature of the slurry polymerization reactor may be 40° C. to 60° C., and the operating temperature of the gas phase polymerization reactor may be 30° C. to 50° C.

The gas phase polymerization reactor may be operated at a temperature below the 15 wt % melting initiation temperature ($MIT_{15}$) measured according to ASTM 3417-83.

The second gas phase polymerization reactor may be operated in a high sorption mode, and in the high sorption mode, a sorbent may be used in an amount of 0.1 parts by weight to 30 parts by weight based on 100 parts by weight of the total circulating gas stream.

Still another embodiment of the present disclosure provides a polyolefin polymerization method including a slurry polymerization step of producing a slurry reaction product including a prepolymer by subjecting a feed composition including a monomer and a comonomer to slurry polymerization at least once in the presence of a catalyst; and a gas phase polymerization step of producing a gas phase reaction product including a final polymer by subjecting the slurry reaction product, or the slurry reaction product and the feed composition, to gas phase polymerization at least once, wherein the reaction temperature of the slurry polymerization step is 20° C. to 70° C. and is higher than the reaction temperature of the gas phase polymerization step, and the final polymer has a density distribution of two or more densities by including a core portion and a shell portion, which has a higher density than the core portion.

The polyolefin polymerization method may include a slurry polymerization step of producing a slurry reaction product including a prepolymer through slurry polymerization of a feed composition including a monomer and a comonomer in the presence of a catalyst; and a gas phase polymerization step of producing a final product through gas phase polymerization of the slurry reaction product, or the slurry reaction product and the feed composition.

The polyolefin polymerization method may include a first slurry polymerization step of producing a first slurry reaction product including a prepolymer through first slurry polymerization of a feed composition including a monomer and a comonomer in the presence of a catalyst; a second slurry polymerization step of producing a second slurry reaction product including a prepolymer through second slurry polymerization of the first slurry reaction product, or the first slurry reaction product and the feed composition; a first gas phase polymerization step of producing a first gas phase reaction product including a final polymer through first gas phase polymerization of the second slurry reaction product, or the second slurry reaction product and the feed composition; and a second gas phase polymerization step of producing a second gas phase reaction product including a final polymer through second gas phase polymerization of the first gas phase reaction product, or the first gas phase reaction product and the feed composition.

The slurry polymerization reaction may produce a prepolymer with a hollow structure to form the shell portion of the final polymer, and the gas phase polymerization reaction may fill the hollow space of the prepolymer with a product having a lower density than the prepolymer to form the core portion of the final polymer.

The shell portion having a density of 0.890 $g/cm^3$ to 0.940 $g/cm^3$ may be formed through the second slurry polymerization step, the core portion having a density of 0.887 $g/cm^3$ to 0.898 $g/cm^3$ may be formed through the first gas phase polymerization step, and the core portion having a density of 0.857 $g/cm^3$ to 0.886 $g/cm^3$ may be formed through the second gas phase polymerization step.

The amount of the produced prepolymer may be 10 wt % to 60 wt % based on the total amount of the produced final polymer.

In the slurry polymerization step, the molar ratio of the comonomer to the total amount of monomers and comonomers may be 0.01 to 0.3.

In the gas phase polymerization step, the molar ratio of the comonomer to the total amount of monomers and comonomers may be 0.01 to 0.2.

DETAILED DESCRIPTION

Figure 1A:
FIG. 1A is a flow chart illustrating a polyolefin polymerization method according to an embodiment.

Terms and words used in the description and claims of the present disclosure should not be construed as limited to their conventional or dictionary meanings but should be construed as meanings and concepts consistent with the technical idea of the present disclosure based on the principle that the inventors can properly define the concepts of terms in order to describe their invention in the best way.

In the present disclosure, the term "stream" may refer to the flow of fluid in a process or the fluid itself flowing in a pipe. Specifically, the "stream" may refer to both the fluid itself and the flow of the fluid flowing in the pipes connecting each device. In addition, the fluid may be gas or liquid, and it does not exclude the fluid containing solid components.

The following embodiments will be described in detail so that those skilled in the art can easily implement them. However, embodiments may be implemented in various forms and are not limited to the embodiments described herein.

The polyolefin polymer according to an embodiment of the present disclosure includes a core portion and a shell portion, and the core portion has a density of 0.857 g/cm³ to 0.910 g/cm³, the shell portion has a density of 0.890 g/cm³ to 0.940 g/cm³, and the density of the shell portion may be higher than that of the core portion.

The polyolefin polymer is a polyolefin polymer with a core-shell structure including a core portion and a shell portion surrounding the core portion, which have the density ranges described above, and since the polyolefin polymer has a relatively high density in the shell portion, that is, at the polymer surface, it is possible to prevent fluidization from being hindered in the gas phase polymerization reactor, aggregation of polymers, or peripheral devices, such as pipes or heat exchangers, from being easily blocked, due to stickiness caused when the surface density of the polymer is low during the polymerization step in producing low density polymers, and thus the polyolefin polymer may be produced through stable and continuous operation.

In an embodiment, the polyolefin polymer may have any one or more of the following physical properties (a) to (h). For example, the polyolefin polymer may have two or more or all of the following physical properties (a) to (h):

(a) a melt flow index (MIE) (2.16 kg load, 190° C.) of 0.1 g/10 min to 5.0 g/10 min;
(b) a density of 0.870 g/cm³ to 0.900 g/cm³;
(c) two or more melting temperatures ($T_m$);
(d) having a first melting temperature ($T_{m1}$) and a second melting temperature ($T_{m2}$), wherein the difference between the first melting temperature and the second melting temperature is 30° C. to 70° C.;
(e) having a first melting temperature ($T_{m1}$) and a second melting temperature ($T_{m2}$), wherein the first melting temperature is 45° C. to 85° C. and the second melting temperature is 80° C. to 125° C.;
(f) two or more crystallization temperatures ($T_c$);
(g) having a first crystallization temperature ($T_{c1}$) and a second crystallization temperature ($T_{c2}$), wherein the first crystallization temperature is 40° C. to 100° C. and the second crystallization temperature is 70° C. to 110° C.; and
(h) having two or more peaks at a temperature of 35° C. or higher in a temperature rising elution fractionation (TREF) chromatogram and a percentage value of 5% or more, obtained by dividing the area under the graph above 60° C. by the total area under the graph.

In (a), melt flow index (MIE) (2.16 kg load, 190° C.) may be the melt flow index value of the polyolefin polymer measured according to ASTM D1238 at 190° C. and a 2.16 kg load. The melt flow index of the polyolefin polymer may be, for example, 0.1 g/10 min to 5.0 g/10 min, 0.5 g/10 min to 4.0 g/10 min, or 0.6 g/10 min to 3.2 g/10 min. Within the above melt flow index range, process stability and processability may be excellent.

In (b), the density may be the density of the polyolefin polymer measured using a density gradient method according to ASTM D1505. The density of the polyolefin polymer may be, for example, 0.870 g/cm³ to 0.900 g/cm³ or 0.885 g/cm³ to 0.890 g/cm³. Within the above density range, a low density polyolefin polymer may be provided.

In (c), the melting temperature ($T_m$) may be the melting temperature of the polyolefin polymer measured according to ASTM 3417-83. The polyolefin polymer may have a melting temperature distribution of two or more melting temperatures. For example, the polyolefin polymer may have a melting temperature distribution of 2 to 4, 2 to 3, or 2 melting temperatures.

In (d), the polyolefin polymer has a first melting temperature ($T_{m1}$) and a second melting temperature ($T_{m2}$), and the difference between the first melting temperature and the second melting temperature may be 30° C. to 70° C., 31° C. to 68° C., or 33° C. to 38° C.

In (e), the first melting temperature may be 45° C. to 85° C., 50° C. to 85° C., or 60° C. to 70° C., and the second melting temperature may be 80° C. to 125° C., 90° C. to 120° C., or 95° C. to 110° C.

In (f), like the melting temperature, the crystallization temperature ($T_c$) may be the crystallization temperature of the polyolefin polymer measured according to ASTM 3417-83. The polyolefin polymer may have a crystallization temperature distribution of two or more crystallization temperatures. For example, the polyolefin polymer may have a crystallization temperature distribution of 2 to 4, 2 to 3, or 2 crystallization temperatures.

In (g), the polyolefin polymer may have a first crystallization temperature ($T_{c1}$) and a second crystallization temperature ($T_{c2}$). The first crystallization temperature may be 40° C. to 100° C., 43° C. to 97° C., or 44° C. to 50° C. The second crystallization temperature may be 70° C. to 110° C., 72° C. to 109° C., or 74° C. to 87° C.

In (h), the temperature rising elution fractionation (TREF) chromatogram may be obtained by analyzing the polyolefin polymer using cross-fractionation chromatography (CFC, PolymerChar CFC-2). The temperature rising elution fractionation (TREF) chromatogram of the polyolefin polymer may show 2 or more, 2 to 5, or 2 peaks at a temperature of 35° C. or higher. In the temperature rising elution fractionation (TREF) chromatogram, a percentage value obtained by dividing the area under the graph above 60° C. by the total area under the graph may be 5% or more, 5% to 55%, or 5% to 50%. It can be confirmed that the polyolefin polymer has a density gradient in that two or more peaks appear in the temperature rising elution fractionation (TREF) chromatogram as described above, and it can be confirmed that a relatively high density shell portion, which is formed through a slurry polymerization reaction and eluted at a high temperature, is well formed in that a percentage value obtained by dividing the area under the graph above 60° C. by the total area under the graph is 5% or more.

In an embodiment, the shell portion may be formed through a slurry polymerization reaction in the polyolefin polymerization system or polymerization method described later. Specifically, in the polyolefin polymer, a shell portion with a hollow structure and relatively high density may be formed first.

The density of the shell portion may be, for example, 0.890 g/cm$^3$ to 0.940 g/cm$^3$, 0.895 g/cm$^3$ to 0.930 g/cm$^3$, or 0.900 g/cm$^3$ to 0.922 g/cm$^3$.

The melt flow index (MIE) (2.16 kg load, 190° C.) of the shell portion may be, for example, 0.01 g/10 min to 5.0 g/10 min, 0.05 g/10 min to 3.5 g/10 min, or 0.05 g/10 min to 2.0 g/10 min.

The melting temperature of the shell portion may be, for example, 80° C. to 125° C., 90° C. to 120° C., or 95° C. to 110° C.

In the temperature rising elution fractionation (TREF) chromatogram of the shell portion, there may be one peak at a temperature of 60° C. or higher.

In an embodiment, the core portion may be formed through a gas phase polymerization reaction in the polyolefin polymerization system or polyolefin polymerization method described later. Specifically, in the polyolefin polymer, the core portion may be formed in a structure in which the hollow space of the shell portion formed through the slurry polymerization reaction is filled with a relatively low density product.

The density of the core portion may be, for example, 0.857 g/cm$^3$ to 0.910 g/cm$^3$, 0.857 g/cm$^3$ to 0.900 g/cm$^3$, or 0.857 g/cm$^3$ to 0.898 g/cm$^3$.

The melting temperature of the core portion may be, for example, 45° C. to 85° C., 50° C. to 85° C., or 60° C. to 70° C.

The weight ratio of the core portion and the shell portion may be 40:60 to 90:10, 50:50 to 80:20, or 50:50 to 70:30. Within the above weight ratio range of the core portion and the shell portion, a low density polyolefin polymer may be provided, and process stability may be further improved by preventing the relative low density core portion from leaking onto the polymer surface.

The polyolefin polymer formed of a core portion and a shell portion with different physical properties as described above not only has a low density, but also prevents the problem of reduced process stability due to sticky and wet properties when the density of the polymer surface is low by forming the surface with a hollow shell portion having a relatively high density and filling the hollow space of the shell portion with a relatively low density core portion.

The melt flow index (MIE) (2.16 kg load, 190° C.) of the polyolefin polymer may be, for example, 0.1 g/10 min to 5.0 g/10 min, 0.5 g/10 min to 4 g/10 min, or 0.6 g/10 min to 3.2 g/10 min.

The polyolefin polymerization system according to an embodiment includes one or more slurry polymerization reactors that produce a slurry reaction product including a prepolymer through slurry polymerization of a feed stream supplied in the presence of a catalyst; and one or more gas phase polymerization reactors that produce a gas phase reaction product including a final polymer through gas phase polymerization of the slurry reaction product, or the slurry reaction product and the feed stream, wherein the feed stream includes a monomer and a comonomer, the final polymer has a density distribution of two or more densities by including a core portion and a shell portion, which has a higher density than the core portion, and the operating temperature of the slurry polymerization reactor is 20° C. to 70° C., which may be higher than the operating temperature of the gas phase polymerization reactor.

The polyolefin polymerization system may be a system for producing the final polymer, that is, the polyolefin polymer described above.

In an embodiment, one or more slurry polymerization reactors and one or more gas phase polymerization reactors may be connected in series.

In an embodiment, the catalyst may be a metallocene single catalyst. The metallocene may be represented by the chemical formula LnMQp, where M is a metal from group IIIB, group IVB, group VB, or group VIB; Q is a $C_1$ to $C_{20}$ hydrocarbyl group or halogen; p is a value obtained by subtracting 2 from the valence of M, and L is the ligand bound to metal M.

The metallocene catalyst is known as a catalyst system that produces polyolefins with excellent physical properties due to high activity and high copolymerization reactivity compared to existing Ziegler-Natta catalysts, and it is a homogeneous catalyst and may be used by supporting it on an appropriate support. For example, the support may be silicon and/or aluminum oxide, and as a specific example, it may be silica with an OH group or a functional group containing an active hydrogen atom, and it may be in the form of porous spherical particles.

The metallocene catalyst may be supported on a support with a cocatalyst, and the cocatalyst may be alkylaluminoxane. The alkylaluminoxane includes straight-chain and/or cyclic alkylaluminoxane oligomers, and when the alkylaluminoxane is a straight-chain alkylaluminoxane oligomer, it is represented by the chemical formula R—(Al (R)—O)$_n$—AlR$_2$, and when it is a cyclic alkylaluminoxane oligomer, it is represented by the chemical formula (—Al (R)—O—)$_m$, where R is a $C_1$-$C_8$ alkyl group, preferably methyl, n is 1-40, preferably 10-20, and m is 3-40, preferably 3-20. The alkylaluminoxane is a mixture of oligomers with a very wide molecular weight distribution, and the typical average molecular weight may be 800 to 1200.

In an embodiment, the feed stream may include a monomer and a comonomer.

The monomer may be ethylene.

The comonomer may be any one or more selected from the group consisting of 1-butene, 1-hexene, 1-pentene, 4-methyl-1-pentene, and 1-octene. As a specific example, the comonomer may be any one or more of 1-butene and 1-hexene.

The feed stream may further include a diluent. The diluent may be any one or more of an inert gas and an alkane. The inert gas may include nitrogen, helium, neon, and the like, and the alkane may include butane, propane, isobutane, isopentane, hexane, and isomers thereof. Thus, a polyolefin polymer may be produced by allowing the catalyst to come in contact with a monomer and a comonomer in a slurry polymerization reactor and a gas phase polymerization reactor using a diluent.

When a feed stream containing ethylene and a comonomer is polymerized in the presence of the catalyst using a system in which one or more slurry polymerization reactors and one or more gas phase polymerization reactors are sequentially arranged, a polyolefin polymer and as a specific example, a polyolefin elastomer, and as a more specific example, low density polyethylene may be produced.

In an embodiment, the operating temperature of the slurry polymerization reactor may be 20° C. to 70° C. or 40° C. to 60° C. The operating temperature of the gas phase polymerization reactor may be lower than that of the slurry polymerization reactor and may be, for example, 30° C. to 50° C. or 35° C. to 48° C. Thus, it is possible to minimize sticky and wet resins, which hinder fluidization of the reactor, by lowering the operating temperature of each reactor and producing the final polymer as described above, and thus process stability may be further improved.

In an embodiment, the operating pressure of the slurry polymerization reactor may be 5 K/G to 30 K/G, 10 K/G to 25 K/G, or 20 K/G to 25 K/G. The operating pressure of the gas phase polymerization reactor may be adjusted to be the same as or lower than the operating pressure of the slurry polymerization reactor, and the pressure of the gas phase polymerization reactor may be, for example, 10 K/G to 20 K/G or 10 K/G to 15 K/G depending on the temperature of the slurry reactor. Thus, it is possible to minimize sticky and wet resins, which hinder fluidization of the reactor, by lowering the operating pressure of each reactor and producing the final polymer as described above, and thus process stability may be further improved. The pressure unit K/G may refer to kg/cm².

In an embodiment, through multi-stage polymerization in one or more slurry polymerization reactors and one or more gas phase polymerization reactors, a prepolymer having a relatively high density and forming a hollow shell portion was produced in the slurry polymerization reaction, and in the gas phase polymerization reactor, a polyolefin polymer, that is, a polyolefin elastomer (POE) was filled in the hollow space of the prepolymer particle to produce the final polymer, and here, the final polymer may have physical properties of the polyolefin elastomer.

In an embodiment, the molar ratio of ethylene and comonomer alpha-olefin in each reactor may be adjusted to 0.01 to 0.3 depending on the type of comonomer. For example, in the slurry polymerization reactor, the molar ratio of the comonomer to the total amount of the monomer and comonomer may be 0.01 to 0.3, 0.05 to 0.3, or 0.07 to 0.27, and in the gas phase polymerization reactor, the molar ratio of the comonomer to the total amount of the monomer and comonomer may be 0.01 to 0.2 or 0.05 to 0.18. Thus, it is possible to produce a polymer with physical properties such as two or more melting temperatures or two or more crystallinity temperatures by varying the comonomer ratio in each reactor, and polymers with high melting temperatures and low glass transition temperatures (Tg) may provide great advantages in terms of processability and physical properties.

The prepolymer produced in the slurry polymerization reactor may account for 10 wt % to 60 wt % of the total amount of the produced final polymer. For example, the prepolymer may be 20 wt % to 50 wt % or 30 wt % to 50 wt % of the total amount of the final polymer. By adjusting the weight ratio of the prepolymer to the total amount of the final polymer within the above range, the overall density is increased and a relatively high density shell portion is firmly formed without reducing the physical properties of the final polymer, and almost no polymer produced in the gas phase polymerization reactor is present on the outside, and thus process stability may be improved.

In an embodiment, the gas phase polymerization reactor may be operated at a temperature below the 15 wt % melting initiation temperature ($MIT_{15}$) measured according to ASTM 3417-83. Specifically, the temperature below $MIT_{15}$ is needed to set the process operating temperature while operating each reactor at low temperatures to ensure process stability. The temperature below $MIT_{15}$ was measured with a DSC device according to ASTM 3417-83, and it was measured based on the area where 15 wt % melt area percent appears in the 1st scan from 25° C. to 200° C. at 10° C./min.

For example, in the gas phase polymerization reactor, the temperature below $MIT_{15}$ may be 40° C. to 80° C., 40° C. to 70° C., or 40° C. to 65° C. When the gas phase polymerization reactor is controlled to be the same temperature as the $MIT_{15}$ temperature, the polymer may agglomerate and process stability may be reduced. On the other hand, when the reactor is operated at an excessively low temperature to ensure process stability, the amount of the production may be very low. In addition, during the production of a polyolefin polymer with a high comonomer content, when the amount of production increases, the comonomer ratio is locally increased, thereby increasing the adhesion of the polymer and producing a heterogeneous polymer, which may cause trouble in the process. Within the above range of the temperature below $MIT_{15}$, the temperature of the gas phase polymerization reactor is adjusted, and thus the above problem may be prevented.

In an embodiment, when the slurry polymerization reactor is disposed in front of the gas phase polymerization reactor, it may be possible to prevent the metallocene catalyst from being directly exposed to the conditions of the gas phase polymerization reactor, and the size of the polymer may be further increased through the slurry polymerization reaction, thereby improving process stability. In addition, when a low density prepolymer is produced in a slurry polymerization reactor, the number of polymers having the physical properties of a polyolefin elastomer increases on the outside, and the overall polymer becomes sticky, which may reduce process stability.

The final polymer according to an embodiment of the present disclosure may be the polyolefin polymer described above. Specifically, the final polymer includes a core portion and a shell portion, and the density of the core portion may be 0.857 g/cm³ to 0.910 g/cm³, the density of the shell portion may be 0.890 g/cm³ to 0.940 g/cm³, and the density of the shell portion may be higher than that of the core portion.

The final polymer may have any one or more of the following physical properties (a) to (h). For example, the polyolefin polymer may have two or more or all of the following physical properties (a) to (h):

(a) a melt flow index (MIE) (2.16 kg load, 190° C.) of 0.1 g/10 min to 5.0 g/10 min;
(b) a density of 0.870 g/cm³ to 0.900 g/cm³;
(c) two or more melting temperatures ($T_m$);
(d) having a first melting temperature ($T_{m1}$) and a second melting temperature ($T_{m2}$), wherein the difference between the first melting temperature and the second melting temperature is 30° C. to 70° C.;
(e) having a first melting temperature ($T_{m1}$) and a second melting temperature ($T_{m2}$), wherein the first melting temperature is 45° C. to 85° C. and the second melting temperature is 80° C. to 125° C.;
(f) two or more crystallization temperatures ($T_c$);
(g) having a first crystallization temperature ($T_{c1}$) and a second crystallization temperature ($T_{c2}$), wherein the first crystallization temperature is 40° C. to 100° C. and the second crystallization temperature is 70° C. to 110° C.; and
(h) having two or more peaks at a temperature of 35° C. or higher in a temperature rising elution fractionation (TREF) chromatogram and a percentage value of 5% or more, obtained by dividing the area under the graph above 60° C. by the total area under the graph.

In an embodiment, the shell portion, that is, the prepolymer produced in the slurry polymerization reactor may have a density of, for example, 0.890 g/cm$^3$ to 0.940 g/cm$^3$, 0.895 g/cm$^3$ to 0.930 g/cm$^3$, or 0.900 g/cm$^3$ to 0.922 g/cm$^3$.

The melt flow index (MIE) (2.16 kg load, 190° C.) of the shell portion may be, for example, 0.01 g/10 min to 5.0 g/10 min, 0.05 g/10 min to 3.5 g/10 min, or 0.05 g/10 min to 2.0 g/10 min.

The melting temperature of the shell portion may be, for example, 80° C. to 125° C., 90° C. to 120° C., or 95° C. to 110° C.

The temperature rising elution fractionation (TREF) chromatogram of the shell portion may have one peak at a temperature of 60° C. or higher.

In an embodiment, the density of the core portion formed inside the hollow prepolymer through the gas phase polymerization reaction may be, for example, 0.857 g/cm$^3$ to 0.910 g/cm$^3$, 0.857 g/cm$^3$ to 0.900 g/cm$^3$, or 0.857 g/cm$^3$ to 0.898 g/cm$^3$.

The melting temperature of the core portion may be, for example, 45° C. to 85° C., 50° C. to 85° C., or 60° C. to 70° C.

The melt flow index (MIE) (2.16 kg load, 190° C.) of the final polymer may be, for example, 0.1 g/10 min to 5.0 g/10 min, 0.5 g/10 min to 4 g/10 min, or 0.6 g/10 min to 3.2 g/10 min.

In the final polymer, the weight ratio of the core portion and the shell portion may be 40:60 to 90:10, 50:50 to 80:20, or 50:50 to 70:30. When the core portion and the shell portion are formed within the above weight ratio range, it is possible to produce a final polymer that has low density and the characteristics of a polyolefin elastomer and may prevent process stability from being reduced when fluidization is hindered due to sticky or wet properties.

Since the shell portion and the core portion have different physical properties as described above, a polyolefin polymer may have two or more melting temperatures and crystallization temperatures.

As an example, the polyolefin polymerization system may include one slurry polymerization reactor and one gas phase polymerization reactor. In this case, the polyolefin polymerization system may include a first slurry polymerization reactor that produces a slurry reaction product including a prepolymer through slurry polymerization of a feed stream supplied in the presence of a catalyst; and a first gas phase polymerization reactor that produces a gas phase reaction product including a final polymer through gas phase polymerization of the slurry reaction product, or the slurry reaction product and the feed stream.

As another example, the polyolefin polymerization system may include one slurry polymerization reactor and two gas phase polymerization reactors. In this case, the polyolefin polymerization system may include a first slurry polymerization reactor that produces a slurry reaction product including a prepolymer through slurry polymerization of a feed stream supplied in the presence of a catalyst; a first gas phase polymerization reactor that produces a first gas phase reaction product including a final polymer through gas phase polymerization of the slurry reaction product, or the slurry reaction product and the feed stream, supplied from the first slurry polymerization reactor; and a second gas phase polymerization reactor that produces a second gas phase reaction product including a final polymer through gas phase polymerization of the first gas phase reaction product, or the first gas phase reaction product and the feed stream, supplied from the first gas phase polymerization reactor.

As still another example, the polyolefin polymerization system may include two slurry polymerization reactors and two gas phase polymerization reactors. In this case, the polyolefin polymerization system may include a first slurry polymerization reactor that produces a first slurry reaction product including a prepolymer through slurry polymerization of a feed stream supplied in the presence of a catalyst; a second slurry polymerization reactor that produces a second slurry reaction product including a prepolymer through slurry polymerization of the first slurry reaction product, or the first slurry reaction product and the feed stream, supplied from the first slurry polymerization reactor; a first gas phase polymerization reactor that produces a first gas phase reaction product including a final polymer through gas phase polymerization of the second slurry reaction product, or the second slurry reaction product and the feed stream, supplied from the second slurry polymerization reactor; and a second gas phase polymerization reactor that produces a second gas phase reaction product including a final polymer through gas phase polymerization of the first gas phase reaction product, or the first gas phase reaction product and the feed stream, supplied from the first gas phase polymerization reactor.

In an embodiment, the first gas phase reaction product produced in the first gas phase polymerization reactor may be filtered through a filter to separate the unreacted gas and the polymer, the separated polymer may be supplied to the second gas phase polymerization reactor, and the unreacted gas may be refluxed to the first slurry polymerization reactor and/or the second slurry polymerization reactor through a purification tower.

When the gas phase polymerization reactor is operated at an excessively low temperature, the amount of production is greatly reduced. In addition, during the process of producing a polyolefin polymer with a high comonomer content, the comonomer ratio is locally high when the amount of production increases, and thus the adhesion of the polymer is increased and a heterogeneous polymer is produced, which may cause trouble in the process. The present disclosure applied a method of reducing the adhesion of the polymer under a high concentration of comonomers in the high sorption mode.

As a specific example, the first gas phase polymerization reactor may not be operated in the high sorption mode, and the second gas phase polymerization reactor may be operated in the high sorption mode. The second gas phase polymerization reactor may be operated at a temperature and pressure at which the injected gas is condensed while the gas discharged from the reactor is not condensed.

For reference, the polyolefin polymerization system may include a circulation line extending from the upper part of the gas phase polymerization reactor and connected to the lower part of the gas phase polymerization reactor to circulate a circulation gas stream, a compressor provided in the circulation line, and a heat exchanger provided at a stage after the compressor based on the flow direction of the circulation gas stream in the circulation line, and in the high sorption mode, the sorbent may be used in an amount of 0.1 parts by weight to 30 parts by weight, 2 parts by weight to 20 parts by weight, or 3 parts by weight to 15 parts by weight, based on 100 parts by weight of the total circulation gas stream.

The sorbent used when the second gas phase polymerization reactor is operated in the high sorption mode may include propane, isobutane, isopentane, and hexane.

The polyolefin polymerization method according to an embodiment may include a slurry polymerization step of producing a slurry reaction product including a prepolymer by subjecting a feed composition including a monomer and a comonomer to slurry polymerization at least once in the presence of a catalyst; and a gas phase polymerization step of producing a gas phase reaction product including a final polymer by subjecting the slurry reaction product, or the slurry reaction product and the feed composition, to gas phase polymerization at least once, wherein the reaction temperature of the slurry polymerization step is 20° C. to 70° C. and is higher than the reaction temperature of the gas phase polymerization step, and the final polymer may have a density distribution of two or more densities by including a core portion and a shell portion, which has a higher density than the core portion.

The polyolefin polymerization method may be a method of producing the final polymer, that is, the above-described polyolefin polymer, using the above-described polyolefin polymerization system.

In an embodiment, the catalyst may be a metallocene single catalyst. The metallocene may be represented by the chemical formula, LnMQp, where M is a metal from group IIIB, group IVB, group VB, or group VIB; Q is a $C_1$ to $C_{20}$ hydrocarbyl group or halogen; p is a value obtained by subtracting 2 from the valence of M, and L is the ligand bound to metal M.

The metallocene catalyst is known as a catalyst system that produces polyolefins with excellent physical properties due to high activity and high copolymerization reactivity compared to existing Ziegler-Natta catalysts, and it is a homogeneous catalyst and may be used by supporting it on an appropriate support. For example, the support may be silicon and/or aluminum oxide, and as a specific example, it may be silica with an OH group or a functional group containing an active hydrogen atom, and it may be in the form of porous spherical particles.

The metallocene catalyst may be supported on a support with a cocatalyst, and the cocatalyst may be alkylaluminoxane. The alkylaluminoxane includes straight-chain and/or cyclic alkylaluminoxane oligomers, and when the alkylaluminoxane is a straight-chain alkylaluminoxane oligomer, it is represented by the chemical formula R—(Al(R)—O)$_n$—AlR$_2$, and when it is a cyclic alkylaluminoxane oligomer, it is represented by the chemical formula (—Al(R)—O—)$_m$, where R is a $C_1$-$C_8$ alkyl group, preferably methyl, n is 1-40, preferably 10-20, and m is 3-40, preferably 3-20. The alkylaluminoxane is a mixture of oligomers with a very wide molecular weight distribution, and the typical average molecular weight may be 800 to 1200.

In an embodiment, the feed stream may include a monomer and a comonomer.

The monomer may be ethylene.

The comonomer may be any one or more selected from the group consisting of 1-butene, 1-hexene, 1-pentene, 4-methyl-1-pentene, and 1-octene. As a specific example, the comonomer may be any one or more of 1-butene and 1-hexene.

The feed stream may further include a diluent. The diluent may be any one or more of an inert gas and an alkane. The inert gas may include nitrogen, helium, neon, and the like, and the alkane may include butane, propane, isobutane, isopentane, hexane, and isomers thereof. Thus, a polyolefin polymer may be produced by allowing the catalyst to come in contact with a monomer and a comonomer in a slurry polymerization reactor and a gas phase polymerization reactor using a diluent.

When a feed stream containing ethylene and a comonomer is polymerized in the presence of the catalyst using a system in which one or more slurry polymerization reactors and one or more gas phase polymerization reactors are sequentially arranged, a polyolefin polymer and as a specific example, a polyolefin elastomer, and as a more specific example, low density polyethylene may be produced.

In an embodiment, the temperature of the slurry polymerization reaction may be 20° C. to 70° C. or 40° C. to 60° C. The temperature of the gas phase polymerization reaction may be lower than that of the slurry polymerization reaction and may be, for example, 30° C. to 50° C. or 35° C. to 48° C. Thus, it is possible to minimize sticky and wet resins, which hinder fluidization of the reactor, by lowering the operating temperature of each reactor and producing the final polymer as described above, and thus process stability may be further improved.

In an embodiment, the pressure of the slurry polymerization reaction may be 5 K/G to 30 K/G, 10 K/G to 25 K/G, or 20 K/G to 25 K/G. The pressure of the gas phase polymerization reaction may be adjusted to the same as or lower than the operating pressure of the slurry polymerization reaction, and for example, the pressure of the gas phase polymerization reaction may be 10 K/G to 20 K/G or 10 K/G to 15 K/G depending on the temperature. Thus, it is possible to minimize sticky and wet resins, which hinder fluidization of the reactor, by lowering the operating pressure of each reactor and producing the final polymer as described above, and thus process stability may be further improved.

In an embodiment, through multi-stage polymerization including one or more slurry polymerization reactions and one or more gas phase polymerization reactions, a prepolymer having a relatively high density and forming a hollow shell portion was produced in the slurry polymerization reaction, and in the gas phase polymerization reaction, a polyolefin polymer, that is, a polyolefin elastomer (POE) was filled in the hollow prepolymer particle to produce the final polymer, and here, the final polymer may have physical properties of the polyolefin elastomer.

In an embodiment, the molar ratio of ethylene and comonomer alpha-olefin in each reaction may be adjusted to 0.01 to 0.3 depending on the type of comonomer. For example, in the slurry polymerization reaction, the molar ratio of the comonomer to the total amount of the monomer and comonomer may be 0.01 to 0.3, 0.05 to 0.3, or 0.07 to 0.27, and in the gas phase polymerization reaction, the molar ratio of the comonomer to the total amount of the monomer and comonomer may be 0.01 to 0.2 or 0.05 to 0.18. It is possible to produce a polymer with physical properties such as two or more melting temperatures or two to more crystallinity temperatures by varying the comonomer ratio in each reaction, and polymers with high melting temperatures and low glass transition temperature (Tg) may provide great advantages in terms of processability and physical properties.

The prepolymer produced in the slurry polymerization reaction may account for 10 wt % to 60 wt % of the total amount of the produced final polymer. For example, the prepolymer may be 20 wt % to 50 wt % or 30 wt % to 50 wt % of the total amount of the final polymer. By adjusting the weight ratio of the prepolymer to the total amount of the final polymer within the above range, the overall density is increased and a relatively high density shell portion is firmly formed without reducing the physical properties of the final polymer, and almost no polymer produced in the gas phase polymerization reactor is present on the outside, and thus process stability may be improved.

In an embodiment, the gas phase polymerization reaction may be performed at a temperature below the 15 wt % melting initiation temperature ($MIT_{15}$) measured according to ASTM 3417-83. Specifically, the temperature below $MIT_{15}$ is needed to set an appropriate temperature range while keeping each reaction temperature low to ensure process stability. The temperature below $MIT_{15}$ was measured with a DSC device according to ASTM 3417-83, and it was measured based on the area where 15 wt % melt area percent appears in the 1st scan from 25° C. to 200° C. at 10° C./min.

For example, in the gas phase polymerization reaction, the temperature below $MIT_{15}$ may be 40° C. to 80° C., 40° C. to 70° C., or 40° C. to 65° C. When the gas phase polymerization reaction is controlled to be the same temperature as the $MIT_{15}$ temperature, the polymer may agglomerate and process stability may be reduced. On the other hand, when the reactor is operated at an excessively low temperature to ensure process stability, the amount of production may be greatly reduced. In addition, during the production of a polyolefin polymer with a high comonomer content, when production increases, the comonomer ratio is locally increased, thereby increasing the adhesion of the polymer and producing a heterogeneous polymer, which may cause trouble in the process. Within the above range of the temperature below $MIT_{15}$, the temperature of the gas phase polymerization reaction is adjusted, and thus the above problem may be prevented.

In an embodiment, when the slurry polymerization reaction is disposed in front of the gas phase polymerization reaction, it may be possible to prevent the metallocene catalyst from being directly exposed to the conditions of the gas phase polymerization reaction, and the size of the polymer may be further increased through the slurry polymerization reaction, thereby improving process stability. When a low density prepolymer is produced in a slurry polymerization reaction, the number of polymers having the physical properties of a polyolefin elastomer increases on the outside, and the overall polymer becomes sticky, which may reduce process stability.

In an embodiment, the slurry polymerization reaction is for producing a prepolymer having a hollow structure to form a shell portion of the final polymer and the gas phase polymerization reaction is for filling the hollow prepolymer with a product having a lower density than the prepolymer to form a core portion of the final polymer.

The final polymer may be the above-described polyolefin polymer. Specifically, the shell portion having a density of 0.890 g/cm³ to 0.940 g/cm³ may be formed through the slurry polymerization step, and the core portion having a 0.857 g/cm³ to 0.910 g/cm³ may be formed through the gas phase polymerization step.

The final polymer may have any one or more of the following physical properties (a) to (h). For example, the polyolefin polymer may have two or more or all of the following physical properties (a) to (h):

(a) a melt flow index (MIE) (2.16 kg load, 190° C.) of 0.1 g/10 min to 5.0 g/10 min;
(b) a density of 0.870 g/cm³ to 0.900 g/cm³;
(c) two or more melting temperatures ($T_m$);
(d) having a first melting temperature ($T_{m1}$) and a second melting temperature ($T_{m2}$), wherein the difference between the first melting temperature and the second melting temperature is 30° C. to 70° C.;
(e) having a first melting temperature ($T_{m1}$) and a second melting temperature ($T_{m2}$), wherein the first melting temperature is 45° C. to 85° C. and the second melting temperature is 80° C. to 125° C.;
(f) two or more crystallization temperatures ($T_c$);
(g) having a first crystallization temperature ($T_{c1}$) and a second crystallization temperature ($T_{c2}$), wherein the first crystallization temperature is 40° C. to 100° C. and the second crystallization temperature is 70° C. to 110° C.; and
(h) having two or more peaks at a temperature of 35° C. or higher in a temperature rising elution fractionation (TREF) chromatogram and a percentage value of 5% or more, obtained by dividing the area under the graph above 60° C. by the total area under the graph.

In an embodiment, the shell portion, that is, the prepolymer produced in the slurry polymerization reaction may have a density of, for example, 0.890 g/cm³ to 0.940 g/cm³, 0.895 g/cm³ to 0.930 g/cm³, or 0.900 g/cm³ to 0.922 g/cm³.

The melt flow index (MIE) (2.16 kg load, 190° C.) of the shell portion may be, for example, 0.01 g/10 min to 5.0 g/10 min, 0.05 g/10 min to 3.5 g/10 min, or 0.05 g/10 min to 2.0 g/10 min.

The melting temperature of the shell portion may be, for example, 80° C. to 125° C., 90° C. to 120° C., or 95° C. to 110° C.

The temperature rising elution fractionation (TREF) chromatogram of the shell portion may have one peak at a temperature of 60° C. or higher.

In an embodiment, the density of the core portion formed inside the hollow prepolymer through the gas phase polymerization reaction may be, for example, 0.857 g/cm³ to 0.910 g/cm³, 0.855 g/cm³ to 0.900 g/cm³, or 0.857 g/cm³ to 0.898 g/cm³.

The melting temperature of the core portion may be, for example, 45° C. to 85° C., 50° C. to 85° C., or 60° C. to 70° C.

The melt flow index (MIE) (2.16 kg load, 190° C.) of the final polymer may be, for example, 0.1 g/10 min to 5.0 g/10 min, 0.5 g/10 min to 4 g/10 min, or 0.6 g/10 min to 3.2 g/10 min. In the final polymer, the weight ratio of the core portion and the shell portion may be 40:60 to 90:10, 50:50 to 80:20, or 50:50 to 70:30. When the core portion and the shell portion are formed within the above weight ratio range, it is possible to produce a final polymer that has a low density and the characteristics of a polyolefin elastomer and may prevent process stability from being reduced when fluidization is hindered due to stickiness or wet properties.

Since the shell portion and the core portion have different physical properties as described above, a polyolefin polymer may have two or more melting temperatures and crystallization temperatures.

As an example, the polyolefin polymerization method may include a slurry polymerization step of producing a slurry reaction product including a prepolymer through slurry polymerization of a feed composition including a monomer and a comonomer in the presence of a catalyst; and a gas phase polymerization step of producing a gas phase reaction product including a final polymer through gas phase polymerization of the slurry reaction product, or the slurry reaction product and the feed composition.

FIG. 1A is a flow chart illustrating a polyolefin polymerization method according to an embodiment. Specifically, referring to FIG. 1A, in the polyolefin polymerization method, a slurry polymerization reaction 100 and a gas phase polymerization reaction 200 may be performed sequentially.

In another example, the polyolefin polymerization method may include a first slurry polymerization step of producing a slurry reaction product including a prepolymer through slurry polymerization of a feed composition including a monomer and a comonomer in the presence of a catalyst; a first gas phase polymerization step of producing a first gas phase reaction product including a final polymer through first gas phase polymerization of the slurry reaction product, or the slurry reaction product and the feed composition; and a second gas phase polymerization step of producing a second gas phase reaction product including a final polymer through second gas phase polymerization of the first gas phase reaction product, or the first gas phase reaction product and the feed composition.

In still another example, the polyolefin polymerization method may include a first slurry polymerization step of producing a first slurry reaction product including a prepolymer through first slurry polymerization of a feed composition including a monomer and a comonomer in the presence of a catalyst; a second slurry polymerization step of producing a second slurry reaction product including a prepolymer through second slurry polymerization of the first slurry reaction product, or the first slurry reaction product and the feed composition; a first gas phase polymerization step of producing a first gas phase reaction product including a final polymer through first gas phase polymerization of the second slurry reaction product, or the second slurry reaction product and the feed composition; and a second gas phase polymerization step of producing a second gas phase reaction product including a final polymer through second gas phase polymerization of the first gas phase reaction product, or the first gas phase reaction product and the feed composition.

Figure 1B:
FIG. 1B is a flow chart illustrating a polyolefin polymerization method according to an embodiment.

FIG. 1B is a flow chart illustrating a polyolefin polymerization method according to an embodiment. Specifically, referring to FIG. 1B, in the polyolefin polymerization method, a first slurry polymerization reaction 110, a second slurry polymerization reaction 120, a first gas phase polymerization reaction 210, and a second gas phase polymerization reaction 220 may be performed sequentially.

In an embodiment, the first gas phase reaction product produced in the first gas phase polymerization reaction is filtered through a filter to separate the unreacted gas and the polymer, the second gas phase polymerization reaction is performed using the separated polymer, and the unreacted gas may be reused in the first slurry polymerization reaction and/or the second slurry polymerization reaction.

Figure 1C:
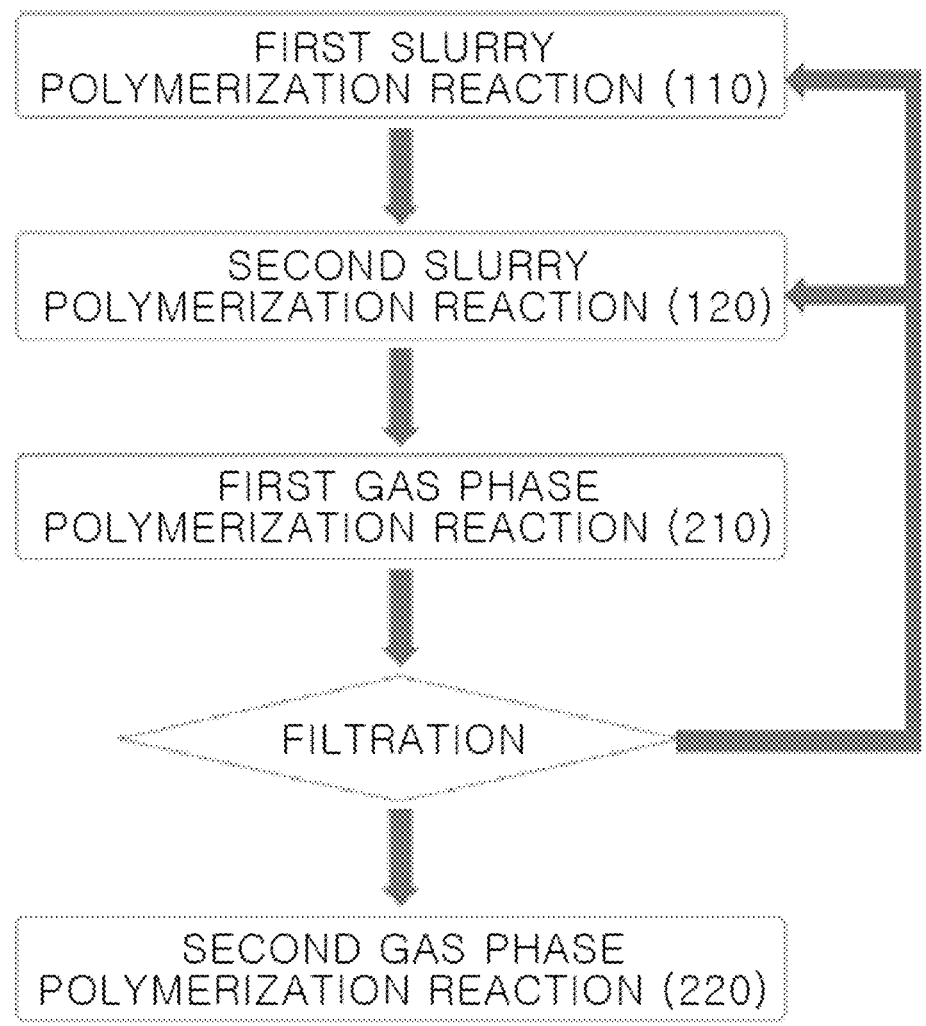
FIG. 1C is a flow chart illustrating a polyolefin polymerization method according to an embodiment.

FIG. 1C is a flow chart illustrating a polyolefin polymerization method according to an embodiment. Specifically, referring to FIG. 1C, in the polyolefin polymerization method, a first slurry polymerization reaction 110, a second slurry polymerization reaction 120, a first gas phase polymerization reaction 210, and a second gas phase polymerization reaction 220 are sequentially performed, and a first gas phase reaction product produced in the first gas phase polymerization reaction 210 is filtered through a filter to separate the unreacted gas and the polymer, the second gas phase polymerization reaction 220 is performed using the separated polymer, and the unreacted gas may be reused in the first slurry polymerization reaction 110 and/or the second slurry polymerization reaction 120.

When the gas phase polymerization reaction is performed at an excessively low temperature, the amount of production is greatly reduced. In addition, during the process of producing a polyolefin polymer with a high comonomer content, the comonomer ratio is locally high when the amount of production increases, and thus the adhesion of the polymer is increased and a heterogeneous polymer is produced, which may cause trouble in the process. In the present disclosure, a method of reducing the adhesion of the polymer under a high concentration of comonomers using a high sorption mode is applied.

As a specific example, the first gas phase polymerization reaction may not be performed in the high sorption mode, and the second gas phase polymerization reaction may be performed in the high sorption mode. The second gas phase polymerization reaction may be performed at a temperature and pressure at which the injected gas is condensed while the gas discharged from the reactor is not condensed.

For reference, the gas phase polymerization reaction may be performed using a circulation line extending from the upper part of the gas phase polymerization reactor and connected to the lower part of the gas phase polymerization reactor to circulate a circulation gas stream, a compressor provided in the circulation line, and a heat exchanger provided at a stage after the compressor based on the flow direction of the circulation gas stream in the circulation line, and in the high sorption mode, the sorbent may be used in an amount of 0.1 parts by weight to 30 parts by weight, 2 parts by weight to 20 parts by weight, or 3 parts by weight to 15 parts by weight, based on 100 parts by weight of the total circulation gas stream.

The sorbent used when the second gas phase polymerization reaction is performed in the high sorption mode may include propane, isobutane, isopentane, and hexane.

When a polyolefin is polymerized including the two slurry polymerization steps and the two gas phase polymerization steps, the shell portion having a density of 0.890 g/cm$^3$ to 0.940 g/cm$^3$ may be formed through the two slurry polymerization steps, the core portion having a density of 0.887 g/cm$^3$ to 0.898 g/cm$^3$ may be formed through the first gas phase polymerization step, and the core portion having a density of 0.857 g/cm$^3$ to 0.886 g/cm$^3$ may be formed through the second gas phase polymerization step.

Through the two slurry polymerization steps, a shell portion having a density of, for example, 0.890 g/cm$^3$ to 0.940 g/cm$^3$, 0.895 g/cm$^3$ to 0.930 g/cm$^3$, or 0.900 g/cm$^3$ to 0.922 g/cm$^3$, may be formed.

Through the first gas phase polymerization step, a core portion having a density of 0.887 g/cm$^3$ to 0.898 g/cm$^3$ or 0.888 g/cm$^3$ to 0.897 g/cm$^3$ may be formed.

Through the second gas phase polymerization step, a core portion having a density of 0.857 g/cm$^3$ to 0.886 g/cm$^3$ or 0.857 g/cm$^3$ to 0.884 g/cm$^3$ may be formed.

Thus, a polyolefin polymer may be produced by forming a shell portion having a relatively high density through a slurry polymerization reaction, forming a core portion, which has a lower density than the slurry polymerization reaction, through a first gas phase polymerization reaction, and forming a core portion, which has a lower density than the first gas phase polymerization reaction, through a second gas phase polymerization reaction. This difference in density allows a catalyst to produce a prepolymer which has a relatively higher density in the slurry polymerization reaction than in the gas phase polymerization reaction, and thus process stability may be improved when the first and second gas phase polymerization reactions are performed later. Due to the density gradient, the produced polyolefin polymer may have a high melting temperature and a low melting temperature, that is, two or more melting temperatures and a low glass transition temperature. Due to such characteristics of the polyolefin polymer, the rotation rate increases during molding, thereby increasing processing productivity, and physical properties such as rebound elasticity may be improved due to the low glass transition temperature.

Hereinafter, specific examples of the present disclosure are presented. However, the following examples are only for illustrating or explaining the present disclosure in detail and are not intended to limit the present disclosure. Additionally, since any content not described herein can be easily inferred technically by those skilled in the art, its description is omitted.

(Production of Polyolefin Polymer)

Examples 1 to 4 and Comparative Examples 1 and 2

A polyolefin polymer, specifically linear low density polyethylene, was produced using one slurry polymerization reactor and one gas phase polymerization reactor. The operating conditions of each reactor are shown in Table 1 below.

A polymerization reaction was performed by simulating the conditions of the slurry polymerization reaction and the gas phase polymerization reaction in a batch polymerization reactor using a catalyst composition prepared by combining a metallocene catalyst, methylaluminoxane (MAO), and a porous support.

To adjust the polymerization temperature, a 2 L-stainless steel autoclave reactor equipped with a jacket capable of supplying external cooling water was heated from room temperature to 110° C., purged with nitrogen, and purged using 400 ml of isobutane.

After adjusting the temperature, 1.5 ml of 0.2 M triethylaluminum (TEAL), 2.5 ml (1.1 mmol in hexane) of antistatic agent (Statsafe® 6000 from Innospec Inc.), and 1 L of isobutane were input to the reactor.

Afterward, ethylene, 1-hexene (wt %, 1-hexene input amount relative to input ethylene), and hydrogen (mg/kgC2, hydrogen input amount (mg) relative to 1 kg of input ethylene) were input, and the supported catalyst was input into the reactor. The slurry polymerization reaction was performed according to the polymerization conditions shown in Table 1 below. During the slurry polymerization, the ethylene partial pressure was kept constant, and 1-hexene and hydrogen were continuously input in conjunction with ethylene. After the slurry polymerization was completed, unreacted 1-hexene and isobutane were discharged.

For the gas phase polymerization reaction, as a diluent, nitrogen was injected at 100 psi into the gas phase polymerization reactor, 250 ppm of antistatic agent was injected, and the temperature was adjusted to 48° C.

After adjusting the temperature, the gas phase polymerization reaction was performed according to the polymerization conditions shown in Table 1 below. After the reaction was completed, unreacted gas was discharged and the reactor was opened to obtain a linear low density polyethylene (LLDPE) resin with flowability as the final polymer, and its physical properties were measured, and results thereof are shown below.

TABLE 1

| Classification | | Example 1 | Example 2 | Example 3 | Example 4 | Comparative Example 1 | Comparative Example 2 |
|---|---|---|---|---|---|---|---|
| Slurry polymerization reactor | Catalyst injection amount (g) | 0.18 | 0.18 | 0.18 | 0.18 | 0.18 | 0.12 |
| | Reactor temperature (° C.) | 60 | 60 | 60 | 60 | 60 | 47 |
| | Reactor pressure (K/G) | 13.1 | 13.1 | 13.1 | 13.1 | 13.1 | 10.8 |
| | 0.2M TEAL (ml) | 1.5 | 1.5 | 1.5 | 1.5 | 1.5 | 1.5 |
| | Ethylene partial pressure (K/G) | 5.4 | 5.4 | 5.4 | 5.4 | 5.4 | 5.4 |
| | Amount of injected hydrogen (ppm) | 40 | 40 | 30 | 30 | 40 | 10 |
| | Amount of injected 1-hexene (wt %) | 10 | 10 | 10 | 10 | 10 | 35 |
| | MIE (g/10 min) | 1.41 | 1.30 | 1.30 | 1.30 | 1.30 | 2.15 |
| | Density (D) (g/cm³) | 0.9206 | 0.9155 | 0.9155 | 0.9155 | 0.9155 | 0.8975 |
| | $T_m$ (° C.) | 113.1 | 115.4 | 115.4 | 115.4 | 115.4 | N/A |
| | $T_c$ (° C.) | 99.8 | 101.8 | 101.8 | 101.8 | 101.8 | N/A |
| Gas phase polymerization reactor | Reactor temperature (° C.) | 48 | 48 | 48 | 48 | 60 | 55 |
| | Reactor pressure (K/G) | 11.7 | 11.7 | 11.7 | 11.7 | 11.7 | 13 |
| | Ethylene partial pressure (K/G) | 4.8 | 4.8 | 4.8 | 4.8 | 4.8 | 6.2 |
| | Amount of injected hydrogen (ppm) | 0 | 0 | 0 | 0 | 0 | 0 |

TABLE 1-continued

| Classification | | Example 1 | Example 2 | Example 3 | Example 4 | Comparative Example 1 | Comparative Example 2 |
|---|---|---|---|---|---|---|---|
| | Amount of injected 1-hexene (wt %) | 35 | 55 | 60 | 70 | 55 | 50 |
| | MIE (g/10 min)[1] | 1.68 | 0.68 | 0.63 | 0.89 | N/A | 1.00 |
| | SR (F/E) | 19.8 | 22.5 | 23.9 | 24.7 | N/A | 19.7 |
| | Density (D) (g/cm$^3$) | 0.8966 | 0.8823 | 0.8786 | 0.8739 | N/A | 0.8816 |
| | $T_m$ (° C.) | 82.2/113.5 | 57.9/115.9 | 57.6/116.5 | 51.3/118.9 | N/A | 56.4 |
| | $T_c$ (° C.) | 96.2/108.3 | 86.5/108.4 | 84.9/107.4 | 84.6/106.2 | N/A | 40.6/96.7 |
| | $T_g$ (° C.) | −45 | −52.7 | −54.0 | −58.2 | N/A | −53.0 |
| | $MIT_{15}$ (° C.) | 68.6 | 60.1 | 61.8 | 59.6 | N/A | N/A |
| | Standalone density (D) (g/cm$^3$) | 0.8738 | 0.8688 | 0.8637 | 0.8572 | N/A | 0.8750 |
| | Fraction (wt %) | 50 | 70 | 70 | 70 | 70 | 70 |
| | B.D | 0.39 | 0.40 | 0.39 | 0.36 | N/A | 0.32 |
| | TREF Fraction at 60° C. or higher (%) | 50 | 25 | 25 | 23 | N/A | N/A |

[1]The MIE in the gas phase polymerization reactor is the measured value of the final polymer.

The measurement method for each of the physical properties in Table 1 above and Table 2 below is shown below.

Melt flow index (MIE, MI2.16): was measured according to ASTM D1238 at 190° C. and 2.16 kg load.

High load melt flow index (MIF, MI21.6): was measured according to ASTM D1238 at 190° C. and 21.6 kg load.

Melt flow rate ratio (SR, MFRR): was calculated as MIF/MIE (F/E).

Density: was measured using the density gradient method according to ASTM D1505.

B.D: was bulk density (apparent density) and measured according to ASTM D1895.

Molecular weight and molecular weight distribution: were measured as follows, using a gel permeation chromatography (GPC) device equipped with a refractive index detector (RI Detector) (GPC-RI; 220 System from Polymer Laboratory Inc.). Two Olexis columns and one guard column were used as separation columns, and the column temperature was maintained at 160° C. Calibration was performed using a standard polystyrene set from Polymer Laboratory Inc. Trichlorobenzene containing 0.0125 wt % of antioxidant (BHT) was used as an eluent, the sample concentration was 1.0 mg/ml, and measurement was performed for 27 minutes under the conditions of an injection amount of 0.2 ml and a pump flow rate of 1.0 ml/min. Number average molecular weight (Mn), weight average molecular weight (Mw), and Z-average molecular weight (Mz) were calculated after universal calibration using polystyrene standard materials, Easical A and Easical B (from Agilent Technologies), and converting them to polyethylene.

Melting temperature ($T_m$) and crystallization temperature ($T_c$): were measured according to ASTM 3417-83 using a DSC device, and the values shown in the 2nd scan in the temperature range from 25 to 200° C. at 10° C./min were used.

Glass transition temperature ($T_g$): was measured according to ASTM 3417-83 using a DSC device, and the values shown in the 2nd scan in the temperature range from −80 to 200° C. at 40° C./min were used.

$MIT_{15}$: was measured according to ASTM 3417-83 using a DSC device and was based on the area where 15 wt % melt area percent appeared in the 1st scan from 25 to 200° C. at 10° C./min.

Comonomer (wt %): was analyzed and calculated through 13C NMR according to ASTM D5017.

Temperature rising elution fractionation (TREF): using a cross-fractionation chromatography (CFC) (PolymerChar CFC-2) device, analysis was performed as follows. Two Olexis columns and one guard column were used as separation columns, the column temperature was maintained at 150° C., and calibration was performed using a standard polystyrene set from Polymer Laboratory Inc. Trichlorobenzene containing 0.0125 wt % of antioxidant (BHT) was used as an eluent, the sample concentration was 75 mg/mL, and the pump flow rate was 1.0 L/min. After the injection of the sample, the temperature of the oven and sample was raised to 150° C. at a heating rate of 40° C./min, maintained at 150° C. for 60 minutes, and then lowered to 95° C. at a cooling rate of 40° C./min. After maintaining the sample at 95° C. for 45 minutes, it was cooled again to 30° C. at a cooling rate of 0.5° C./min and maintained for 30 minutes. Afterward, while increasing the temperature of the sample from 35° C. to 120° C., the fractions by temperature were divided into 22 at intervals of 4° C., 0.5 mL of sample was injected into each fraction, and the eluted fraction was passed through a TREF column and an Olexis column to simultaneously obtain the TREF value and molecular weight. The molecular weight was calculated after universal calibration using polystyrene standard materials, Easical A and Easical B (from Agilent Technologies), and converting them to polyethylene. Data processing was performed using "CFC Calibration," a device-attached analysis program, and it took about 600 minutes for the analysis. An infrared spectrometer was used as a detector.

Standalone density: was calculated using Equation 1 below.

$$\frac{m4}{d4} = \frac{1}{d} - \frac{m1}{d1} - \frac{m2}{d2} - \frac{m3}{d3} \qquad \text{[Equation 1]}$$

In Equation 1, d is the density of the final polymer, d1 and m1 are respectively the standalone density and fraction (wt %) of the polymer produced in the first slurry polymerization reactor, d2 and m2 are respectively the standalone density and fraction (wt %) of the polymer produced in the second slurry polymerization reactor, d3 and m3 are respectively the standalone density and fraction (wt %) of the polymer produced in the first gas phase polymerization reactor, d4 and m4 are respectively the standalone density and fraction (wt %) of the polymer produced in the second gas phase polymerization reactor, and m1+m2+m3+m4=1.

Here, for Examples 1 to 4 and Comparative Examples 1 and 2 using one slurry polymerization reactor and one gas phase polymerization reactor, it was assumed that the first slurry polymerization reactor and the second gas phase polymerization reactor were used, and factors related to the second slurry polymerization reactor and the first gas phase polymerization reactor were excluded from the equation before calculation.

Examples 5 to 7 and Comparative Example 3

A polyolefin polymer, specifically linear low density polyethylene, was produced using two slurry polymerization reactors and two gas phase polymerization reactors using a catalyst composition (M-Cat') prepared by combining a metallocene catalyst, methylaluminoxane (MAO), and a porous support. The operating conditions of each reactor are shown in Table 2 below.

The fluidized beds of the first slurry polymerization reactor and the second slurry polymerization reactor are composed of polymer particle granules. 1-Butene, ethylene, and hydrogen were mixed in a pipe and injected into the circulation line, and the injected composition and physical properties of the produced prepolymer are listed in Table 2 below.

The concentrations of injected ethylene, hydrogen, and 1-butene in the first and second gas phase polymerization reactors were adjusted to maintain the compositions listed in Table 2 below. In addition, the prepolymer was supplied in an amount of 5 wt % to 10 wt % of the total weight of the polymerization composition (prepolymer+ethylene+1-butene), and in the component concentrations of the first and second gas phase polymerization reactors in Table 2 below, the mole percent of the remaining amount other than ethylene, hydrogen, and 1-butene refers to propane as a diluent.

The concentration of all gases was measured by online gas chromatography of the gases in the circulation gas stream. The reaction product discharged from the first gas phase polymerization reactor passed through a filter separating the unreacted gas from the polymer, and then the polymer was transferred to the second gas polymerization reactor, and the separated unreacted gas passed through the purification tower and was injected into the first slurry polymerization reactor. The slurry polymerization reactor and the gas phase polymerization reactor used propane as a diluent, and the copolymer of ethylene and 1-butene produced by the catalytic reaction was continuously discharged and driven so that the height of the fluidized bed of the gas phase polymerization reactor was maintained constant. In order to keep the operating temperature constant, the heat generated by the polymerization reaction was removed by controlling the temperature of the circulating gas using a heat exchanger.

Afterward, the reaction product was discharged from the second gas phase polymerization reactor, degassed and dried to obtain a linear low density polyethylene (LLDPE) resin as the final polymer, and its physical properties were measured, and results thereof are shown in Table 2.

TABLE 2

| Classification | | Example 5 | Example 6 | Example 7 | Comparative Example 3 |
|---|---|---|---|---|---|
| First slurry polymerization reactor | Amount of injected catalyst (kg/h) | 3.5 | 3.1 | 3.1 | — |
| | Reactor temperature (° C.) | 50 | 47 | 47 | — |
| | Reactor pressure (K/G) | 25.4 | 25.4 | 25.4 | — |
| | Amount of injected ethylene (kg/h) | 600 | 600 | 550 | — |
| | Amount of injected hydrogen (g/h) | 0 | 0 | 20 | — |
| | Comonomer molar ratio | 0.158 | 0.268 | 0.192 | — |
| | MIE (g/10 min) | 0.52 | 0.07 | 1.93 | — |
| | Density (D) (g/cm$^3$) | 0.9180 | 0.9068 | 0.9098 | — |
| Second slurry polymerization reactor | Reactor temperature (° C.) | 50 | 46 | 46 | — |
| | Reactor pressure (K/G) | 24 | 24 | 24 | — |
| | Amount of injected ethylene (kg/h) | 300 | 300 | 250 | — |
| | Amount of injected hydrogen (g/h) | 0 | 0 | 0 | — |
| | Comonomer molar ratio | 0.073 | 0.150 | 0.125 | — |
| | MIE (g/10 min) | 0.72 | 0.42 | 1.53 | — |
| | Density (D) (g/cm$^3$) | 0.9175 | 0.9070 | 0.9084 | — |

TABLE 2-continued

| Classification | | Example 5 | Example 6 | Example 7 | Comparative Example 3 |
|---|---|---|---|---|---|
| First gas phase polymerization reactor | Reactor temperature (° C.) | 43 | 41 | 41 | — |
| | Reactor pressure (K/G) | 14 | 12.8 | 12.6 | — |
| | Amount of injected ethylene (kg/h) | 1500 | 1550 | 1551 | — |
| | Ethylene concentration (mol %) | 4.6 | 3.7 | 4.4 | — |
| | Hydrogen concentration (mol ppm) | 17 | 33 | 39 | — |
| | Comonomer molar ratio | 0.074 | 0.102 | 0.096 | — |
| | MIE (g/10 min) | 0.95 | 1.14 | 3.11 | — |
| | SR (F/E) | 17.4 | 17.7 | 16.9 | — |
| | Density (D) (g/cm$^3$) | 0.9046 | 0.8952 | 0.8973 | — |
| | Standalone density (D) (g/cm$^3$) | 0.8970 | 0.8883 | 0.8914 | — |
| Second gas phase polymerization reactor | Reactor temperature (° C.) | 43 | 41 | 41 | — |
| | Reactor pressure (K/G) | 14 | 13.7 | 13.1 | — |
| | Amount of injected ethylene (kg/h) | 5225 | 5001 | 5728 | — |
| | Ethylene concentration (mol %) | 7.6 | 8.4 | 7.4 | — |
| | Hydrogen concentration (mol ppm) | 56 | 79 | 110 | — |
| | Comonomer molar ratio | 0.148 | 0.150 | 0.150 | — |
| | MIE (g/10 min)[1] | 0.95 | 1.07 | 3.04 | 1.01 |
| | SR (F/E) | 15.9 | 16.8 | 16.9 | 40.4 |
| | Density (D) (g/cm$^3$) | 0.8900 | 0.8851 | 0.8856 | 0.8873 |
| | Standalone density (D) (g/cm$^3$) | 0.8834 | 0.8805 | 0.8809 | — |
| | Mw | 133,985 | 123,984 | 91,888 | N/A |
| | $T_m$ (° C.) | 68.9/105.6 | 62.2/95.3 | 63.6/98.7 | 73.6 |
| | $T_c$ (° C.) | 49.3/87.0 | 44.7/74.9 | 44.3/77.6 | 60.1/72.7 |
| | $T_g$ (° C.) | −42.7 | −44.1 | −44.5 | −40.9 |
| | $MIT_{15}$ (° C.) | 52.6 | 48.5 | 46.1 | N/A |
| | Comonomer (wt %) | 17.9 | 19.6 | 20.2 | N/A |
| | Fraction (wt %) | 68 | 68 | 71 | — |
| | TREF Fraction at 60° C. or higher (%) | 18 | 10 | 8 | 3 |

[1] The MIE in the second gas phase polymerization reactor is the measured value of the final polymer.

In Table 2, the comonomer is 1-butene, the comonomer molar ratio is the molar ratio of 1-butene to the total amount of ethylene and 1-butene.

Experimental Examples

Experimental Example 1: Confirmation of the Structure of the Polyolefin Polymer

1. Cross Section of Prepolymer

Figure 2A:
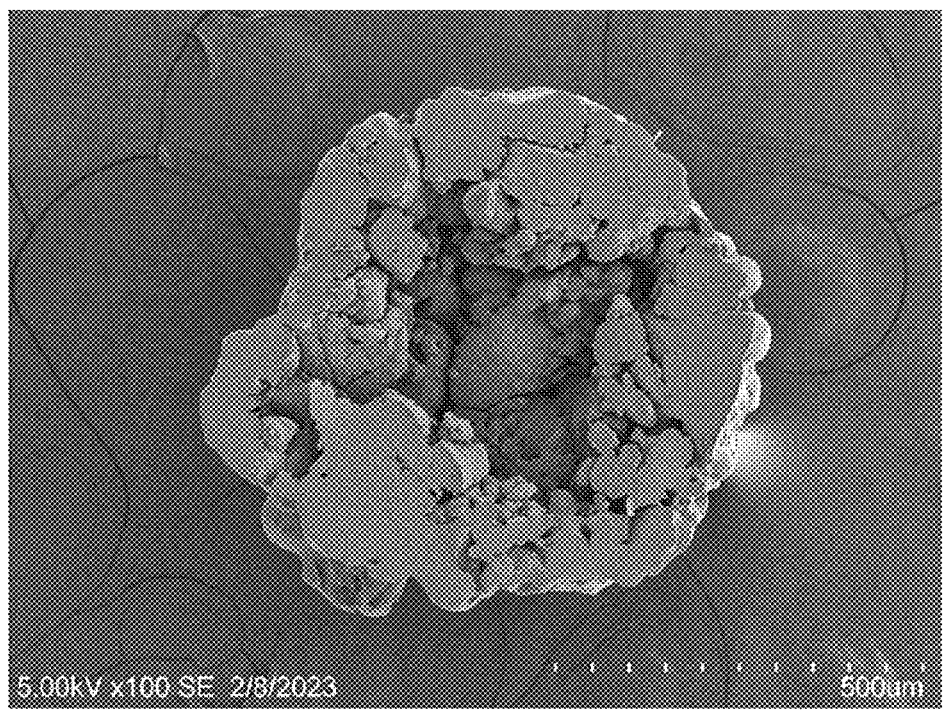
FIG. 2A is a cross-sectional SEM image of the prepolymer produced in Example 2.

A cross-section of the prepolymer contained in the reaction product produced in the slurry polymerization reactor in Example 2 was photographed using a scanning electron microscope (SEM), and the image is shown in FIG. 2A.

Referring to FIG. 2A, it can be seen that a prepolymer having a hollow structure was produced through the slurry polymerization reaction, thereby forming the shell portion of the final polymer.

2. Cross Section of Final Polymer

Figure 2B:
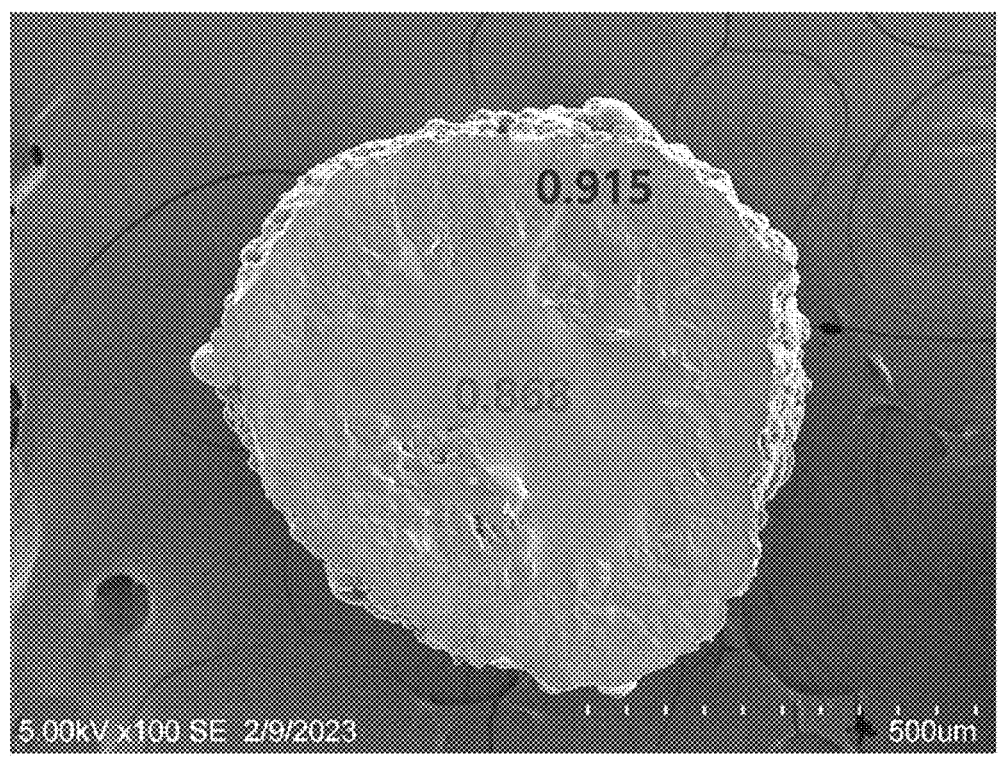
FIG. 2B is a cross-sectional SEM image of the final polymer produced in Example 2.

A cross-section of the final polymer contained in the reaction product produced in the gas phase polymerization reactor in Example 2 was photographed using a scanning electron microscope (SEM), and the image is shown in FIG. 2B. In addition, the densities of the shell portion and the core portion are indicated on the image.

Referring to 2B, it can be seen that a relatively low density core portion was formed in the hollow prepolymer through the gas phase polymerization reaction.

3. Cross Section of Final Polymer Before and After Dissolution in Xylene

Figure 2C:
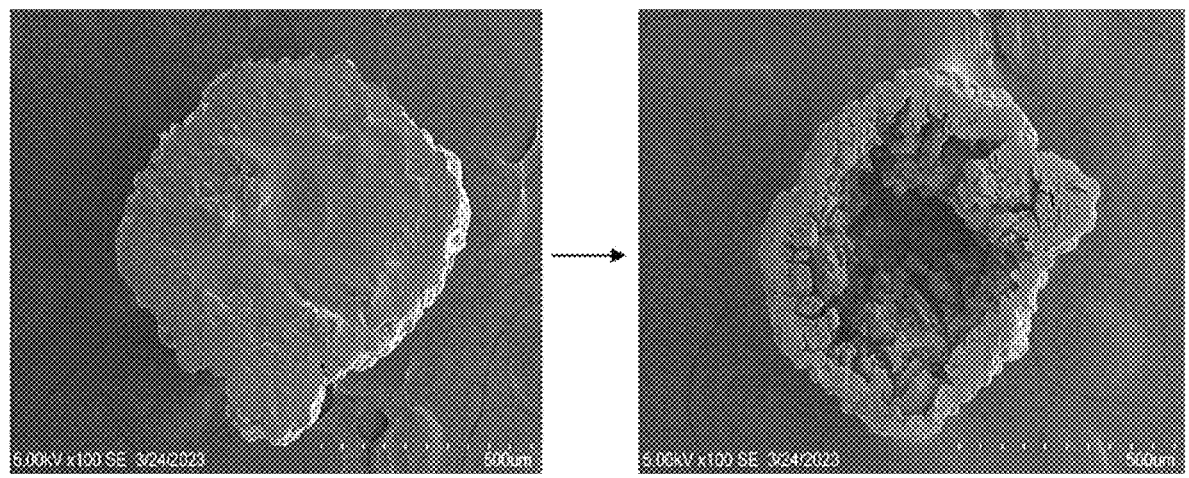
FIG. 2C is a set of SEM images of the final polymer produced in Example 2 before and after dissolution in xylene.

Using a scanning electron microscope (SEM), the cross section of the final polymer contained in the reaction product produced in the gas phase polymerization reactor in Example 2 and the cross section of the final polymer after dissolving it in a xylene solution were photographed, and the images are shown in FIG. 2C. Specifically, the left image in FIG. 2C is an image taken before dissolving the final polymer in a xylene solution, and the right image is an image taken after dissolving the final polymer in a xylene solution.

The above xylene dissolution experiment is an experiment that can confirm that the portion with a low density and high MI is dissolved and eluted in xylene, and as shown in FIG. 2C, when the final polymer is dissolved in xylene, it can be seen that only the core portion with a relatively low density is dissolved, and the shell portion with a high density of 0.916 remains undissolved. Thus, it can be confirmed that the final polymer according to the present disclosure has a core-shell structure in which a core portion with a low density is formed inside and a shell portion, which has a high density and surrounds the core portion, is formed outside.

Experimental Example 2: Confirmation of Polyolefin Polymer by TREF

For the final polymers produced in Examples 1 to 7 and Comparative Example 3, the TREF value according to the temperature was measured by the above-described method to derive a temperature rising elution fractionation (TREF) chromatogram, which can be confirmed through Tables 1 and 2. In addition, FIG. 3 shows the derived temperature rising elution fractionation (TREF) chromatogram for the final polymers produced in Example 5 and Comparative Example 3.

Figure 3:
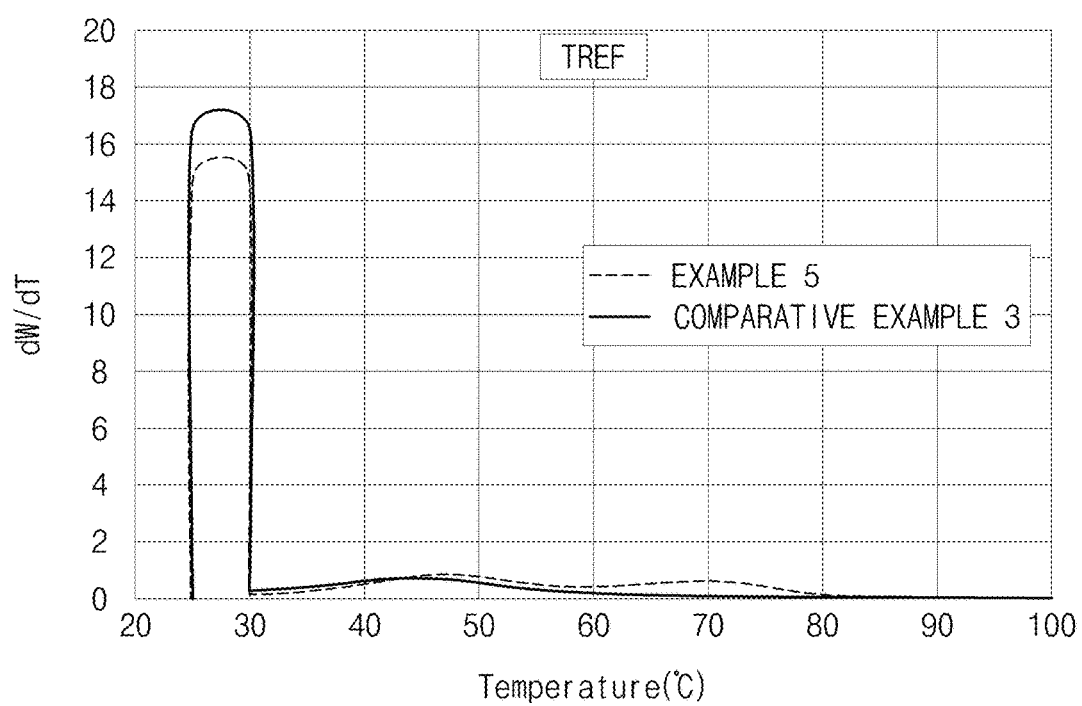
FIG. 3 is a temperature rising elution fractionation (TREF) chromatogram showing TREF values measured according to temperature for the final polymers produced in Example 5 and Comparative Example 3.

Referring to Tables 1 and 2, and FIG. 3, it can be seen that the final polymers according to Examples 1 to 7 show two peaks at a temperature of 35° C. or higher and have a percentage value of 5% or more, which is obtained by dividing the area under the graph above 60° C. by the total area under the graph. On the other hand, it can be seen that the final polymer according to Comparative Example 3 shows one peak at a temperature of 35° C. or higher and has a percentage value of 3%, which is obtained by dividing the area under the graph above 60° C. by the total area under the graph.

When producing a polyolefin polymer, process stability can be secured by using one or more slurry polymerization reactors and one or more gas phase polymerization reactors of the present disclosure and controlling the operating conditions of each slurry polymerization reactor and gas phase polymerization reactor, and thus the polyolefin polymer produced thereby can have a structure including a core portion and a shell portion and having a density distribution so that the density of the shell portion is higher than that of the core portion.

DESCRIPTION OF THE REFERENCE NUMBERS

100: Slurry polymerization reaction
110: First slurry polymerization reaction
120: Second slurry polymerization reaction
200: Gas phase polymerization reaction
210: First gas phase polymerization reaction
220: Second gas phase polymerization reaction

What is claimed is:

1. A polyolefin polymer comprising:
   a core portion; and
   a shell portion,
   wherein the density of the core portion is 0.857 g/cm$^3$ to 0.910 g/cm$^3$, the density of the shell portion is 0.890 g/cm$^3$ to 0.940 g/cm$^3$, and the density of the shell portion is higher than the density of the core portion.

2. The polyolefin polymer of claim 1, wherein the polyolefin polymer has any one or more of the following physical properties (a) to (h):
   (a) a melt flow index (MIE) (2.16 kg load, 190° C.) of 0.1 g/10 min to 5.0 g/10 min;
   (b) a density of 0.870 g/cm$^3$ to 0.900 g/cm$^3$;
   (c) two or more melting temperatures ($T_m$);
   (d) having a first melting temperature ($T_{m1}$) and a second melting temperature ($T_{m2}$), wherein the difference between the first melting temperature and the second melting temperature is 30° C. to 70° C.;
   (e) having a first melting temperature ($T_{m1}$) and a second melting temperature ($T_{m2}$), wherein the first melting temperature is 45° C. to 85° C. and the second melting temperature is 80° C. to 125° C.;
   (f) two or more crystallization temperatures ($T_c$);
   (g) having a first crystallization temperature ($T_{c1}$) and a second crystallization temperature ($T_{c2}$), wherein the first crystallization temperature is 40° C. to 100° C. and the second crystallization temperature is 70° C. to 110° C.; and
   (h) having two or more peaks at a temperature of 35° C. or higher in a temperature rising elution fractionation (TREF) chromatogram and a percentage value of 5% or more, which is obtained by dividing the area under the graph above 60° C. by the total area under the graph.

3. The polyolefin polymer of claim 1, wherein the core portion has a density of 0.857 g/cm$^3$ to 0.910 g/cm$^3$ and a melting temperature of 45° C. to 85° C., the shell portion has a melt flow index (MIE) (2.16 kg load, 190° C.) of 0.01 g/10 min to 5.0 g/10 min, a density of 0.890 g/cm$^3$ to 0.940 g/cm$^3$, a melting temperature of 80° C. to 125° C., and one peak which is observed at a temperature of 60° C. or higher in the temperature rising elution fractionation (TREF) chromatogram, and the weight ratio of the core portion and the shell portion is 40:60 to 90:10.

4. A polyolefin polymerization system comprising:
   a first slurry polymerization reactor that produces a first slurry reaction product including a prepolymer through slurry polymerization of a feed stream supplied in the presence of a catalyst;
   a second slurry polymerization reactor that produces a second slurry reaction product including a prepolymer through slurry polymerization of the first slurry reaction product, or the first slurry reaction product and the feed stream, supplied from the first slurry polymerization reactor;
   a first gas phase polymerization reactor that produces a first gas phase reaction product including a final polymer through gas phase polymerization of the second slurry reaction product, or the second slurry reaction product and the feed stream, supplied from the second slurry polymerization reactor; and
   a second gas phase polymerization reactor that produces a second gas phase reaction product including a final polymer through gas phase polymerization of the first gas phase reaction product, or the first gas phase reaction product and the feed stream, supplied from the first gas phase polymerization reactor, wherein the feed stream includes a monomer and a comonomer, the final polymer has a density distribution of two or more densities by including a core portion and a shell portion, which has a higher density than the core portion, and the operating temperature of the first slurry polymerization reactor and the second slurry polymerization reactor is 20° C. to 70° C., which is higher than the operating temperature of the first gas phase polymerization reactor and the second gas phase polymerization reactor.

5. The system of claim 4, wherein the catalyst is a metallocene single catalyst.

6. The system of claim 4, wherein the monomer is ethylene.

7. The system of claim 4, wherein the comonomer is any one or more selected from the group consisting of 1-butene, 1-hexene, 1-pentene, 4-methyl-1-pentene, and 1-octene.

8. The system of claim 4, wherein the operating temperature of the first slurry polymerization reactor and the second slurry polymerization reactor is 40° C. to 60° C., and the operating temperature of the first gas phase polymerization reactor and the second gas phase polymerization reactor is 30° C. to 50° C.

9. The system of claim 4, wherein the first gas phase polymerization reactor and the second gas phase polymerization reactor are operated at a temperature below a 15 wt % melting initiation temperature ($MIT_{15}$) measured according to ASTM 3417-83.

10. The system of claim 4, wherein the second gas phase polymerization reactor is operated in a high sorption mode, and in the high sorption mode, a sorbent is used in an amount of 0.1 parts by weight to 30 parts by weight based on 100 parts by weight of the total circulating gas stream.

11. A polyolefin polymerization method comprising:
a slurry polymerization step of producing a slurry reaction product including a prepolymer by subjecting a feed composition including a monomer and a comonomer to slurry polymerization at least once in the presence of a catalyst; and
a gas phase polymerization step of producing a gas phase reaction product including a final polymer by subjecting the slurry reaction product, or the slurry reaction product and the feed composition, to gas phase polymerization at least once,
wherein the reaction temperature of the slurry polymerization step is 20° C. to 70° C. and is higher than the reaction temperature of the gas phase polymerization step, and the final polymer has a density distribution of two or more densities by including a core portion and a shell portion, which has a higher density than the core portion.

12. The method of claim 11, comprising:
a slurry polymerization step of producing a slurry reaction product including a prepolymer through slurry polymerization of a feed composition including a monomer and a comonomer in the presence of a catalyst; and
a gas phase polymerization step of producing a gas phase reaction product including a final product through gas phase polymerization of the slurry reaction product.

13. The method of claim 11, comprising:
a first slurry polymerization step of producing a first slurry reaction product including a prepolymer through first slurry polymerization of a feed composition including a monomer and a comonomer in the presence of a catalyst;
a second slurry polymerization step of producing a second slurry reaction product including a prepolymer through second slurry polymerization of the first slurry reaction product, or the first slurry reaction product and the feed composition;
a first gas phase polymerization step of producing a first gas phase reaction product including a final polymer through first gas phase polymerization of the second slurry reaction product, or the second slurry reaction product and the feed composition; and
a second gas phase polymerization step of producing a second gas phase reaction product including a final polymer through second gas phase polymerization of the first gas phase reaction product, or the first gas phase reaction product and the feed composition.

14. The method of claim 11, wherein the slurry polymerization reaction produces a prepolymer with a hollow structure to form the shell portion of the final polymer, and the gas phase polymerization reaction fills the hollow space of the prepolymer with a product having a lower density than the prepolymer to form the core portion of the final polymer.

15. The method of claim 13, wherein the shell portion having a density of 0.890 g/cm³ to 0.940 g/cm³ is formed through the second slurry polymerization step, the core portion having a density of 0.887 g/cm³ to 0.898 g/cm³ is formed through the first gas phase polymerization step, and the core portion having a density of 0.857 g/cm³ to 0.886 g/cm³ is formed through the second gas phase polymerization step.

16. The method of claim 11, wherein the amount of the produced prepolymer is 10 wt % to 60 wt % based on the total amount of the produced final polymer.

17. The method of claim 11, wherein in the slurry polymerization step, the molar ratio of the comonomer to the total amount of monomers and comonomers is 0.01 to 0.3.

18. The method of claim 11, wherein in the gas phase polymerization step, the molar ratio of the comonomer to the total amount of monomers and comonomers is 0.01 to 0.2.

* * * * *